United States Patent [19]

Birch

[11] Patent Number: 4,530,979

[45] Date of Patent: Jul. 23, 1985

[54] CONTINUOUS POLYMERIZATION OF WATER-MISCIBLE POLYMERS

[75] Inventor: James R. Birch, Midland, Mich.

[73] Assignee: The Dow Company, Midland, Mich.

[21] Appl. No.: 504,762

[22] Filed: Jun. 15, 1983

[51] Int. Cl.³ .............................................. C08F 2/16
[52] U.S. Cl. ...................................... 526/64; 526/62; 526/88
[58] Field of Search ............................ 526/62, 64, 88

[56] References Cited

U.S. PATENT DOCUMENTS

| | | | |
|---|---|---|---|
| 4,110,521 | 8/1978 | Barnett | 526/64 |
| 4,143,222 | 3/1979 | Goretta | 526/64 |
| 4,331,787 | 5/1982 | Fairchok | 526/64 |

*Primary Examiner*—Paul R. Michl

[57] ABSTRACT

A continuous adiabatic process for preparing water-miscible and water-soluble polymers wherein an aqueous solution containing monomer and an initiator system is passed through a reactor and reacted to yield a rapid increase in viscosity as polymerization occurs. The polymer product exhibits consistent cross-sectional properties in the reactor over time and moves slowly and easily through the reactor as a plug.

7 Claims, No Drawings

CONTINUOUS POLYMERIZATION OF WATER-MISCIBLE POLYMERS

BACKGROUND OF THE INVENTION

This invention relates to the polymerization of water-miscible monomers in aqueous solution.

Most water-soluble polymers, particularly polymers of acrylamide, acrylic acid and their water-miscible derivatives have been employed commercially as additives in the manufacture of paper products, as water purification coagulants, as dispersing agents, and as treating agents in a wide variety of applications.

Of the various methods employed to polymerize water-miscible monomers, the aqueous solution polymerization method in a batch mode is most commonly employed because it is inexpensive and can provide water-soluble polymers having high molecular weight. In such a method, the concentrations of monomer and resulting polymer in aqueous solution are maintained as high as possible in order to reduce the amount of water that is subsequently removed from the resulting polymer product. Unfortunately, the high viscosities of the resulting polymer solution, even at fairly low conversion, limit the initial monomer concentration to below a 2 or 3 weight percent concentration. This concentration limit leads to poor reactor utilization and the high viscosity leads to poor reactor heat transfer due to the inability to stir the contents.

The problems that result from the high viscosities of relatively dilute aqueous solutions of such water-soluble polymers have been solved by suspending or emulsifying the aqueous solution of water-miscible monomer in a water-immiscible organic liquid and forming a relatively unstable suspension or a relatively stable emulsion of the desired water-soluble polymer. Methods of practicing such suspension or emulsion polymerization are described in U.S. Pat. Nos. 2,982,749 and 3,284,393, respectively. These methods significantly increase the concentration of monomer and resulting polymer in the suspension or emulsion as compared to the amount of monomer or polymer present in the aforementioned batch techniques while maintaining workable viscosities. Unfortunately, the cost incurred in employing such processes is high due to the use of organic solvents which are not recovered or reused. It has also been difficult to practice such methods in a continuous manner.

Water-soluble polymers can be prepared in a continuous manner using a tubular reactor as described in U.S. Pat. No. 4,110,521. Static mixers are used to promote plug flow and heat transfer while running the polymerization isothermally. The continuous tubular reactors enjoy cost and utilization advantages over batch processes but, unfortunately, such processes require costly temperature control systems, costly static mixing elements, and high pressures to force highly viscous gels through the system. U.S. Pat. No. 4,331,787 offers a partial solution to the requirement of high pressure that forces the resulting polymer through the system by employing a water-immiscible fluid to lubricate the flow of emulsified polymer gels during continuous tubular polymerization. Unfortunately, such a process still requires pressure to force the polymer through the system, and the addition of a lubricant can contaminate the polymer product and add to processing costs.

In view of the aforementioned deficiencies of the prior art methods, it is highly desirable to provide a continuous process for polymerizing water-miscible monomers to form water-soluble polymers that have high molecular weights, which process comprises a compact, simple, self-contained and energy efficient system without the use of water-immiscible solvents and lubricants.

SUMMARY OF THE INVENTION

The present invention is a continuous adiabatic process for preparing water-soluble polymers wherein an aqueous solution containing a water-miscible monomer mixture together with suitable initiators is passed through a reactor. The monomer mixture is sufficiently reactive as to effect a rapid increase in viscosity as said monomer mixture is subjected to conditions sufficient to polymerize the monomer in the reactor thereby forming the desired polymer product which exhibits consistent cross-sectional properties in the reactor over time. The product so formed moves consistently and easily through the reactor as a plug.

By the term "plug" is meant that the polymer product passing through the reactor exhibits a flat cross-sectional velocity profile and undergoes minimal amounts of axial backmixing. The monomers are sufficiently reactive to rapidly polymerize within the reactor as the monomers are subjected to conditions sufficient to polymerize said monomers. Thus, factors such as temperature, initiator type, etc., as well as monomer purity or quality can affect the type of product formed. Also, the process can be carried out in a continuous manner to produce a polymer which is high in molecular weight yet contains no water-insoluble gels. The process of this invention requires no reactor internals to promote mixing, heat transfer or plug flow and, thus, consequently operates at relatively low pressure.

The polymers prepared in accordance with the practice of this invention are useful in the same applications as similar water-soluble polymers prepared by conventional polymerization methods. Examples of such applications include additives for the manufacture of paper, agents for the treatment of sewage and industrial waste waters, thickeners, dispersing agents, mobility control agents, and the like.

DETAILED DESCRIPTION OF THE INVENTION

Water-miscible monomers suitably employed in the practice of this invention are those ethylenically unsaturated monomers which are sufficiently water-miscible to form a single aqueous phase when 5 weight parts of the monomer are dispersed in water. Such monomers readily undergo addition polymerization to form polymers which are at least inherently water-dispersible and preferably water-soluble. By "inherently water-dispersible" is meant that the polymer, when contacted with an aqueous medium, will disperse therein without the aid of surfactants to form a colloidal dispersion of the polymer in the aqueous medium. Preferably, such polymers are sufficiently water-soluble in that they will form at least a 5 weight percent solution when dissolved in water. Exemplary water-miscible monomers include the water-miscible ethylenically unsaturated amides such as acrylamide, methacrylamide and fumaramide; water-miscible N-substituted ethylenically unsaturated amides such as N-(N',N'-dialkylaminoalkyl)acrylamide, e.g., N-(N',N'-dimethylaminomethyl)acrylamide and quaternized derivatives thereof such as N-(N',N',N'- trimethylammonium methyl)acrylamide chloride and N-substituted alkylol acrylamide such as N-methylol acrylamide; ethylenically unsaturated carboxylic acids such as acrylic acid, methacrylic acid, fumaric acid and the like; ethylenically unsaturated quaternary ammonium compounds such as vinylbenzyl trimethylammonium chloride; sulfoalkyl esters of carboxylic acids such as 2-sulfoalkyl methacrylate as well as the alkali metal and ammonium salts thereof; aminoalkyl esters and quaternary ammonium alkyl of unsaturated carboxylic acids such as 2-aminoethyl methacrylate and 2-(N,N,N-trimethylammonium)ethyl methacrylate chloride; vinyl aryl sulfonates such as vinylbenzene sulfonate as well as the alkali metal and ammonium salts thereof; diallyl quaternary ammonium compounds such as dimethyl diallyl ammonium chloride and diethyl diallyl ammonium chloride; N-(sulfoalkyl)acrylamides and methacrylamides such as N-(2-sulfo-1,1-dimethylethyl)acrylamide; ethylenically unsaturated amines such as allyl and diallylamine and the like. Of the foregoing water-miscible monomers, acrylamide and the water-miscible derivatives of acrylamide as well as acrylic acid and methacrylic acid and mixtures of such monomers are preferred. Especially preferred are acrylamide and mixtures of acrylamide and acrylic acid containing from about 10 to about 30 weight percent of acrylic acid. It is also desirable to employ a mixture of monomer and sodium carbonate as, for example, acrylamide and sodium carbonate, sodium bicarbonate, soluble hydroxides and the like to yield a partially hydrolyzed polymer.

Normally, such polymerization is carried out in the presence of a polymerization initiator capable of generating free radicals. Exemplary polymerization initiators include the inorganic persulfates such as potassium persulfate, ammonium persulfate and sodium persulfate, azo catalyst such as azobisisobutyronitrile and dimethyl azoisobutyrate; organic peroxygen compounds such as benzyl peroxide, t-butyl peroxide, diisopropylbenzene hydroperoxide and t-butyl hydroperoxide. Of these initiators, the organic peroxygen compounds are preferred. Particularly preferred are combinations of these peroxygen compounds with reducing agents to provide conventional redox catalyst systems. Examples of such reducing agents are sodium bisulfite, sodium borohydride, ferrous chloride, and the like. Preferred initiator systems include mixtures of t-butyl peroxide, sodium persulfate and sodium bisulfite. Also preferred is a mixture of t-butyl peroxide and sodium borohydride. In addition to the aforementioned ingredients, the polymerization recipe desirably includes a chelating reagent such as the penta sodium salt of diethylenetriamine pentaacetic acid, ethylene diamine tetraacetic acid, or any reagent that is effective in sequestering free ions such as ferrous or cuprous ions which interfere with polymerization processes.

The amount of oxidizing agent employed in the polymerization process is between about 100 and about 2000 ppm based on the weight of the monomer. It is most desirable that the amount of initiator be sufficient to prevent slow polymerization and, hence, yield a high rate of conversion of monomer to polymer in order that the polymer product will gel and lead to uniform flow through the reactor. However, it is desirable that the amount of initiator not be too high as to result in the formation of a low molecular weight polymer product. The amount of reducing agent employed is preferably in the range from about 0 to about 30 ppm based on the weight of the monomer. As with the oxidizing agents, an excessive amount of reducing agent will lead to a low molecular weight polymer product.

The amount of monomer employed in the polymerization process is between about 6 and about 30, more preferably between about 15 and about 30, weight percent based on the weight of the monomer and the total aqueous feed. The amount of monomer or mixture of monomers depends on the type of monomer employed. It is desirable that the monomer result in a water-soluble polymer of sufficient molecular weight to form a thick gel product. It is desirable that the concentration of monomer be great enough in order that the polymer product will gel and lead to uniform flow of the gel through the reactor. It is critical in the process of this invention that the monomer be sufficiently reactive to rapidly gel, thus, building up viscosity quite rapidly. Thus, if "plug" flow is not established, channeling of reactants through the reactor and pressure surging occur. Such occurrences lead to gel products which are inconsistent in their properties. In addition, the concentration of monomer should be great enough to exhibit a temperature rise in the reactor which will lead to high polymer conversion. However, it is desirable that the concentration of monomer not be too high, as the resulting high adiabatic temperatures in the reactor can lead to low molecular weight products or excessive polymer product degradation. In addition, an extremely high monomer concentration can require excessive pressure to force the polymer product through the reactor.

The system employed in the process of this invention most advantageously includes a neutralization reactor equipped with a jacket, agitator and various shot tanks. To this reactor is added the monomer mix. The system is also equipped with several feed tanks for the monomer mix and each of the various initiators. It is preferable that the feed tanks be equipped with pressure gauges, level transmitters, vacuum lines, nitrogen inlets for providing pressure to the system and sparging tank contents, and pumping apparatus for forcing reactants into a mixing chamber. The reactants are forwarded to a primary reactor which is operated adiabatically and insulated to minimize heat loss during operation. At the primary reactor exit the system can be equipped with a means for injecting and mixing additional initiator to decompose residual, unreacted monomer. A series of static mixing elements leading to a secondary reactor is usually satisfactory. It is desirable that temperature probes be present in the system in order to monitor various temperatures in the primary reactor, the static mixer elements and the secondary reactor. The product, which is a gel, exits the secondary reactor through a control valve in order that back pressure on the system can keep the reactor hydraulically full. Although any material which is relatively inert to the reactants and which can tolerate the pressures experienced within the system can be employed in constructing the system, the preferred materials used to construct the system are stainless steel alloys.

The primary and secondary reactors employed in the polymerization process of this invention are of sufficient cross-sectional area as to lead to slow axial velocities which are typically less than about 5 meters per hour. It is most preferred that the cross-sectional shape of the reactors is circular. The overall geometry of the reactors can vary depending upon the desired operating pressures, the monomer mix, initiator, levels and the product desired. Most preferably, the reactor is tubular in shape. The residue time of the primary reactor is typically sufficient for high conversion to occur; generally from 1 to 4 hours.

The length of the reaction time is not particularly critical so long as the mixture remains in the reactor for a time sufficient to polymerize essentially all monomer. Normally, residence times range from about 0.5 to about 4, preferably from about 1 to about 2, hours. Accordingly, the length and diameter (volume) of the reactor are sufficient to attain the aforementioned residence times.

In the process of this invention, an aqueous monomer mix is prepared and fed into a feed tank. In a like manner, a separate feed tank(s) is prepared containing sequestering and chelating agents, oxidizing agents and reducing agents. The contents of each of the feed tanks are mixed with one another and fed into a primary reactor which has been described hereinbefore. Polymerization and gelation occurs rapidly in the reactor leading to a temperature rise therein. The rapid viscosity buildup in the reactor is believed to cause the viscous gel to move slowly through the reactor as a "plug." It is believed that the shear thinning nature of the gel will enhance the plug flow effect since the high shear stress at the wall of the reactor will lead to a lower local viscosity which thus promotes slippage at the wall.

It is desirable that the gel move through the reactor as a "plug" having a flat cross-sectional velocity profile in order that there exist minimal amounts of axial backmixing. The lack of backmixing of polymer with reactants leads to a narrow residence time of reactants in the reactor. This results in consistent polymerization products over time.

The temperatures employed in the practice of this invention are not particularly critical and are generally those conventionally employed in polymerizing such water-miscible monomers. Preferably, such temperatures range from about 10° to about 100° C., most preferably from about 25° to about 60° C. The maximum temperature will depend upon the initial monomer concentration as the reactor operates adiabatically. In most instances, it is desirable to polymerize the monomer in two stages, an initial stage wherein the monomer is subjected to temperatures less than 70° C., preferably from about 25° to about 55° C., and a second stage wherein the mixture is subjected to temperatures in excess of 70° C., preferably from about 75° to about 100° C. In order to practice this two-stage procedure, it is desirable to pass the mixture through two reactors, an initial or a primary reactor operating at a temperature below 70° C., and subsequent or secondary reactor operating at a temperature in excess of 70° C. It is found that the employment of this two-stage polymerization procedure improves the physical properties of the polymer. The secondary reactor is typically the same size and design as the primary reactor and is employed to maintain high temperatures necessary to reduce the amount of residual, unreacted monomer to acceptable levels. It is understood, however, that the temperature is governed by the adiabatic character of the process and the particular monomer combination which is used. The temperature most advantageously should not exceed about 90° C. in order that polymer product degradation does not occur.

Recovery of the polymer from the reactor is readily achieved since the resulting polymer gel flows readily through the reactor. Thus, the polymer can be recovered as a solid by conventional drying techniques or transferred directly to a continuous dilution device. If the polymer is to be stored as a powder or similar finely divided particulate matter, it is advantageous to subject it to air drying to prevent subsequent agglomeration of the particulate. Accordingly, recovery of the polymer is generally achieved according to conventional techniques.

The polymers prepared by the process of this invention can be used in industrial applications as such polymers have previously been employed. For example, such polymers can be used as thickeners, dispersants, coagulants, and the like in a wide variety of industrial applications. An especially preferred use of the polymers is as a mobility control agent in enhanced oil recovery applications. It is possible to dilute the resulting gel directly to field-use conditions directly from the polymerization system. Thus, shipping costs associated with delivering the polymer to the point of use are significantly reduced. In addition, it is possible to prepare a polymer at a particular site which can be specifically designed for the particular conditions under which it will be used.

The following examples are given to illustrate the preferred embodiments of the invention and should not be construed as limiting its scope. Unless otherwise indicated, all parts and percentages are by weight.

EXAMPLE 1

A feed solution of monomer mix is prepared by adding into a small batch reactor 7200 grams of a 50 percent acrylamide solution, 1080 grams of sodium carbonate, and 6280 grams of filtered water. The mixture is agitated for 30 minutes, transferred by vacuum to a storage tank, and deoxygenated by recirculating the tank contents with nitrogen until the oxygen level is below 0.5 ppm. The monomer feed tank is pressurized with nitrogen.

A second feed solution comprising an oxidizer mix is prepared by adding 10.3 grams of a 70 percent t-butyl hydroperoxide solution, 36 grams of a 40 percent solution of the pentasodium salt of a diethylenetriamine pentaacetic acid, and 2571 grams of filtered water. The mixture is capped, shaken, transferred to a separate feed tank, deoxygenated by sparging with nitrogen for 30 minutes, and the feed tank is pressurized with nitrogen.

A third feed solution comprising a reducer mix is prepared by adding 0.06 gram of a 12 percent sodium borohyride solution, 21.2 grams of a 50 percent sodium hydroxide solution, and 2571 grams of filtered water. The mixture is capped, shaken, transferred to a separate feed tank, deoxygenated by sparging with nitrogen for 30 minutes, and the feed tank is pressurized with nitrogen.

The three feed solutions are pumped into a rotary mixing device at the rate of 1286 grams/hour for the monomer mix and 107 grams/hour for each of the oxidizer and reducer mixes. The solutions are mixed briefly and the mixture is allowed to flow into a stainless steel main reactor 4 inches in diameter and 24 inches long. At steady state, the main reactor temperature exotherms to 60° C. and the pressure is 170 psig. The viscous gel is transferred to a secondary reactor that has dimensions similar to the main reactor. The temperature in the secondary reactor is 85° C. and the pressure is 50 psig. Each of the reactors is electrically traced and insulated to minimize heat losses. The average residence time of monomer or polymer in each of the reactors is 2 hours.

The gel exiting the secondary reactor is 29.2 percent solids, contains 0.03 percent residual monomer, and has undergone 14 percent hydrolysis. The 0.3 percent solution viscosity of the polymer as determined using an Ostwald Viscometer (25° C., 4 percent sodium chloride solution) is 9.6 cps.

EXAMPLE 2

A feed solution of monomer mix is prepared as follows by adding into a small batch reactor 2341 grams of a 50 percent acrylamide solution, 505 grams of acrylic acid, 513 grams of a 50 percent aqueous sodium hydroxide solution, and 1782 grams of filtered water. The mixture is agitated for 30 minutes, transferred by vacuum to a storage tank, and deoxygenated by recirculating the tank contents with nitrogen until the oxygen level is below 0.5 ppm. The monomer feed tank is pressurized with nitrogen.

A second feed solution comprising an oxidizer mix is prepared by adding 0.707 gram of a 70 percent t-butyl hydroperoxide solution, 9.9 grams of a 40 percent solution of the pentasodium salt of a diethylenetriamine pentaacetic acid, 0.1485 gram of sodium persulfate, and 3142 grams of filtered water. The mixture is capped, shaken, transferred to a separate feed tank, deoxygenated by sparging with nitrogen for 30 minutes, and the feed tank is pressurized with nitrogen.

A third feed solution comprising a reducer mix is prepared by adding 0.02 gram of sodium persulfate and 3142 grams of filtered water. The mixture is capped, shaken, transferred to a separate feed tank, deoxygenated by sparging with nitrogen for 30 minutes, and the feed tank is pressurized with nitrogen.

The three feed solutions are pumped into a rotary mixing device at the rate of 643 grams/hour for the monomer mix and 357 grams/hour for each of the oxidizer and reducer mixes. The solutions are mixed briefly and the mixture is allowed to flow into a stainless steel main reactor 4 inches in diameter and 24 inches long. At steady state, the main reactor temperature exotherms to 60° C. and the pressure is 135 psig. A mix of 59.4 grams of sodium sulfite and 1257 grams of water is pumped into the gel at a rate of 143 grams/hour and mixed with a series of Ross LPD static mixers. The viscous gel is then transferred to a secondary reactor that has dimensions similar to the main reactor. The temperature in the secondary reactor is 85° C. and the pressure is 50 psig. Each of the reactors is electrically traced and insulated to minimize heat losses. The average residence time of monomer or polymer in each of the reactors is 2 hours.

The gel exiting the secondary reactor is 15.4 percent solids and contains 0.03 percent residual monomer. The 0.3 percent solution viscosity of the polymer as determined using an Ostwald Viscometer (25° C., 4 percent sodium chloride solution) is 4.6 cps.

What is claimed is:

1. A continuous adiabatic process for preparing water-miscible high molecular weight polymers which comprises passing an aqueous solution containing a water-miscible monomer mixture together with suitable initiators through a reactor, said monomer mixture being sufficiently reactive as to effect a rapid increase in viscosity as said monomer mixture is subjected to conditions sufficient to polymerize the monomer in the reactor, thereby forming the desired polymer product which exhibits consistent cross-sectional properties in the reactor over time, wherein said product so formed is in the form of a gel and moves consistently and easily through the reactor as a plug.

2. A process of claim 1 wherein said reactor is tubular in shape.

3. A process of claim 1 wherein the polymer is water-soluble.

4. A process of claim 3 wherein the monomer mixture comprises acrylamide or a mixture of acrylic acid and acrylamide.

5. A process of claim 1 wherein said aqueous solution comprises from about 6 to about 30 weight percent monomer based on the total weight of the aqueous solution.

6. A process of claim 1 wherein said polymer product is passed through a secondary reactor to reduce the amount of residual, unreacted monomer.

7. A process of claim 1 wherein said aqueous solution comprises from about 15 to about 30 weight percent monomer based on the total weight of the aqueous solution.

* * * * *